United States Patent Office 3,293,208
Patented Dec. 20, 1966

3,293,208
STABILIZATION OF POLYOLEFINS WITH CERTAIN METAL DITHIOPHOSPHINATE SALTS
Jerry Peter Milionis and Frank Joseph Arthen, Jr., both of Franklin Township, Somerset County, N.J., assignors to American Cyanamid Company, Stamford, Conn., a corporation of Maine
No Drawing. Filed Apr. 6, 1964, Ser. No. 357,738
5 Claims. (Cl. 260—45.75)

This application is a continuation-in-part of application, Serial No. 292,721, filed July 3, 1963, and now abandoned.

This invention generally relates to the provision of stabilized polyolefins such as polyethtylene and polypropylene. In particular, it relates to a means of stabilizing polyolefins against the deteriorative action of light and heat by incorporating therein a metal di(substituted)dithiophosphinate salt, and to the resulting stabilized polyolefin compositions. Additionally, it relates to certain new metal dithiophosphinate salts.

The stabilizers employed herein are represented by the following formula (I):

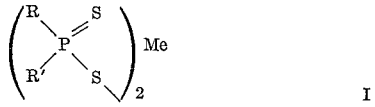

wherein R and R' are alkyl of 2–18 carbon atoms, cycloalkyl of 5–6 carbon atoms, monocyclic lower aralkyl or cyanoethyl, and "Me" represents the divalent cation of zinc, nickel, lead, cadmium, calcium, barium, magnesium copper, tin and manganese.

It is well-known that polyolefinic resins tend to deteriorate upon exposure to light and heat, with consequential loss of tensile strength and flexibility, and, in the case of clear resin compositions, the appearance of unwanted colr. Attempts to treat this problem have generally involved the incorporation of a U.V. absorber into the polyolefin, which absorber had the ability to preferentially absorb U.V. radiation and, thus, in effect, shield the resin itself from the damaging radiation. Attempts to protect the composition against the effects of heat require the addition of a separate heat stabilizer. These have been successful to a great degree, but they have their limitations. The most important is the ineffectiveness of either type of additive to "shield" the polyolefins from the deteriorating effects of both heat and light. This difficulty of requiring two additives (especially notable in the case of polypropylene compositions which must be heated to relatively high temperatures during the shaping thereof) has not been overcome heretofore by the incorporation of a single additive. The requirement for two additives instead of only one for overall stabilization of polyolefins, while it is not intolerable, confers upon the user the inconvenience of having to measure, mix and add two materials instead of merely one.

Previous isolated attempts to uncover single stabilizers which could accomplish the required dual function, have met with varying degrees of success and, in general, there is still a need for an improved stabilizer capable of conferring both heat and light stability to polyolefin compositions.

The present invention very satisfactorily fills this need. In accordance therewith, a salt within the scope of Formula I is added to the polyolefin so that it is present in a concentration of about 0.01 percent to about 5.0 percent by weight of the composition. The resulting resin mixture has highly improved stability to both light and heat as compared with a control having no stabilizer. Moreover, the stabilizer is compatible without imparting substantial color to the resin at proportions which are effective for the above-named stabilization purposes.

It is surprising that the metal salts of the dithiophosphinate esters defined in Formula I are effective, since, in contrast thereto, related compounds such as the corresponding ammonium salt or the precursor acid, or analogous aryl substituted compounds, are quite ineffective. Whereas compositions of this invention may be exposed to heat and light for extremely long periods of time without development of brittleness, compositions without the aforementioned materials develop brittleness in very short periods, and sometimes are little better than control compositions with no additive.

A desirable feature of compounds of Formula I is their excellent heat stability. This thermal stability is especially important in reference to their use in polypropylene since this polymer is normally processed at temperatures of 250 to 280° C. Without adequate stability, the protective agent will not withstand such conditions.

The stabilizers of Formula I are readily incorporated into resins to be stabilized by milling and mixing means conventional in the art. While, as stated above, it is not required that two stabilizers be employed to effect the desired stabilization, this is not to say that the stabilizer of Formula I cannot be used in conjunction with other stabilizers. Other stabilizers may be desirable when the resins are processed above conventional temperatures. As auxiliary stabilizers there may be named the hindered phenols such as 2,6-di-tert-butyl-4-methylphenol,
2,4,6-tri-tert-butylphenol,
4,4'-thiobis(6-tert-butyl-m-cresol),
4,4'-methylenebis(2,6-di-tert-butylphenol),
4,4'-methylenebis(6-tert-butyl-m-cresol),
4,4'-butylidenebis(6-tert-butyl-m-cresol),
2,6-bis(2-hydroxy-3-t-butyl-5-methylbenzyl)-p-cresol,
2,2'-methylenebis(4-ethyl-6-tert-butylphenol),
2,2'-methylenebis(4,6-dinonylphenol) and
2,2'-methylenebis(4-methyl-6-tert-butylphenol);

phosphites such as triphenylphosphite, tridecylphosphite and dodecylphenylphosphite; and thiodipropionic acid esters such as dilauryl thiodipropionate. Polyolefins containing a combination of the metal stabilizers of Formula I and the above named auxiliary stabilizers are able to encounter extreme conditions without showing an adverse change in color, odor or viscosity characteristics. If desired, the resin composition may also contain coloring agents, extenders, plasticizers, solvents, etc.

Among the class of stabilizers represented by Formula I are found several subclasses which are preferred for ease of use, economy and effectiveness. Thus, salts of nickel, lead and particualrly zinc, are preferred over other salts. Additionally, salts wherein R and R' are alkyl of 4–12 carbons (e.g., butyl, octyl and dodecyl), cyclohexyl, phenethyl, β-methylphenethyl, α-methylbenzyl, are preferred over others.

The compounds of Formula I are conveniently prepared by reaction of a secondary phosphine with sulfur in the presence of ammonium hydroxide. This is illustrated by the following:

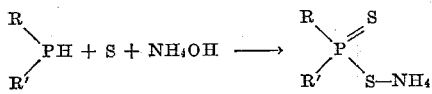

The ammonium salt is then converted to the various metal salts by reaction with the water-soluble metal salt corresponding to "Me."

The invention is further illustrated by the Examples which follow.

EXAMPLE 1

Zinc dicyclohexyl dithiophosphinate

A mixture of 86.5 g. sulfur, 500 ml. of concentrated ammonium hydroxide, 500 ml. water and 400 ml. ethanol is stirred at room temperature while bubbling in helium. To this is added 244 g. of dicyclohexylphosphine, dropwise over one hour. An exotherm raises the temperature to 45° C. Stirring is continued 30 minutes after addition without external heating; then the mixture is heated at 65° C. for one hour. It is cooled and filtered and to the filtrate is added 178.6 g. of $ZnSO_4.7H_2O$ in 250 cc. water. The white solid which forms is filtered, washed well with water and then acetone. The solid is recrystallized from 1:1 cyclohexane xylene and filtered, giving 180 g. of zinc dicyclohexyldithiophosphinate as a white crystalline product, melting point 215–216° C.

EXAMPLE 2

Nickel di-n-butyldithiophosphinate

The filtered reaction mixture from 14.6 g. di-n-butylphosphine, 7 g. sulfur and 100 ml. of 14 percent ammonium hydroxide is combined with 12 g. of $NiCl_2.6H_2O$ in 40 ml. water. The resulting solution is extracted with ether, dried and evaporated under vacuum to obtain the violet, nickel di-n-butyl-dithiophosphinate, melting point 83–86° C. The solid is recrystallized from methanol, melting point 89–90° C.

EXAMPLE 3

Nickel dicyclohexyldithiophosphinate

To a 75 ml. aliquot (approximately equal to 0.066 mole) of the ammonium salt filtrate from Example 1, a solution of 8.4 g. (0.033 mole) of nickel (II) nitrate hexahydrate in 100 ml. of water is added. A greenish-blue precipitate forms. Two hundred ml. of chloroform are added with stirring and the bottom layer of chloroform and solid are separated from the water layer and evaporated on the steam bath to a medium-blue solid. The solid is extracted overnight, using benzene. The benzene extract is evaporated leaving the product as a crystalline solid, melting point 270–275° C.

EXAMPLE 4

Nickel di-n-octyldithiophosphinate

The viscous reaction mixture from 10 g. di-n-octylphosphine, 2.8 g. sulfur and 100 ml. of 14 percent ammonium hydroxide is combined with 10 g. $NiCl_2.6H_2O$ in 550 ml. water. The resulting solution is extracted with ether, dried and evaporated under vacuum to obtain an oil which is dissolved in a 1:1½ warm butanol-methanol solution. After standing at 0° C. overnight, nickel di-n-octyldithiophosphinate crystallizes, melting point 45–48° C. The solid is recrystallized from a benzene-methanol mixture, melting point 49–51° C.

EXAMPLE 5

Lead dicyclohexyldithiophosphinate

Following the same procedure of Example 1, 235 g. of $Pb(OAc)_2.3H_2O$ in 250 ml. of water is added to the ammonium salt filtrate. The tan solid, which forms, is filtered and washed with water. The solid is recrystallized from benzene and filtered, giving lead dicyclohexyldithiophosphinate, a crystalline solid, melting point 231–232° C.

EXAMPLE 6

The procedure of Example 1 is followed, using in place of the zinc sulfate an equivalent amount of copper chloride, cadmium chloride, manganous chloride and stannous chloride to prepare, respectively, the copper, cadmium, manganese and tin dicyclohexyldithiophosphinates.

EXAMPLE 7

The procedure of Example 1 is followed except that equivalent quantities of di-n-octylphosphine and di-t-octylphosphine are used in place of the dicyclohexylphosphine to prepare zinc di-n-octyldithiophosphinate and zinc di-t-octylthiophosphinate (obtained as oils).

EXAMPLE 8

Evaluation in polypropylene

Effectiveness in polypropylene was determined by preparation of polypropylene compositions and exposure to ultraviolet light and heat, the time of exposure before development of brittleness being determined. The procedure is described in more detail as follows:

Procedure

Fifty grams of polypropylene powder were placed in a screw-top jar along with the predetermined amount of the compound to be tested. The blend was tumbled for two hours. This mixture was placed on a 6" x 13" mill whose rolls were heated to 360° F. and 320° F., respectively. This blend was passed through the nip of the rolls, stripped from the rolls and fed endwise into the nip to insure maximum mixing. This operation of stripping and passing through the nip was repeated ten times. From the sheet resulting from this blend, an 18-mill sheet was compression-molded. From this molded sheet, specimens were cut out for the Fade-Ometer test and the forced-draft air oven test.

In the following table of results are shown the hours exposure in the Fade-Ometer and hours exposure in a 140° C. oven to the brittle point.

In the following table of results are shown the hours exposure in the Fade-Ometer and hours exposure in a 140° C. oven to the brittle point.

TABLE.—HOURS EXPOSURE TO REACH BRITTLE POINT (IN POLYPROPYLENE)

| No. | Dithiophosphinate Compound | Percent | Oven-Aging, 140° C. | Fade-Ometer Exposure |
|---|---|---|---|---|
| 1 | Zinc dicyclohexyl | 0.05 | 260–280 |  |
| 2 | ----do---- | 0.1 | 380–390 |  |
| 3 | ----do---- | 0.2 | 639–655 | 600–700 |
| 4 | ----do---- | 0.5 | 1,630–1,660 |  |
| 5 | Nickel di-n-octyl | 0.25 | 448 | 1,000 |
| 6 | Lead dicyclohexyl | 0.2 | 206–216 | 400–500 |
| 7 | Zinc di-n-octyl | 0.2 | 240–260 | 800–900 |
| 8 | Nickel di-n-butyl | 0.25 |  | 2,000 |
| 9 | ----do---- | 0.5 |  | >2,000 |
| 10 | Nickel dicyclohexyl | 0.25 | 78 | 1,300 |
| 11 | Nickel di-dodecyl | 0.25 | 312 | 1,600 |
| 12 | Nickel di-p-phenethyl | 0.25 | 456 | 300 |
| 13 | Cadmium dicyclohexyl | 0.2 | 125–135 | 700–800 |
| 14 | Copper (II) dicyclohexyl | 0.25 | 492 | 500 |
| 15 | Manganese (II) dicyclohexyl | 0.25 | 300 | 500 |
| 16 | Ammonium dicyclohexyl | 0.2 | 36–44 | 300–400 |
| 17 | Ammonium di-n-butyl | 0.2 | 8–20 | 100–200 |
| 18 | Zinc diphenyl | 0.2 | 36–44 | 200–300 |
| 19 | Dicyclohexyl acid | 0.2 | 28–43 |  |
| 20 | Control |  | 4–6 | 60–100 |

As can be seen from the foregoing, the additives of this invention are vastly superior to either the corresponding free acids, aryl esters or non-metallic salts shown in Items 16, 17, 18 and 19. While the ammonium salts impart a degree of light stability, they are not very effective heat stabilizers and, thus, do not satisfy the bilateral objects of this invention.

We claim:
1. A composition having stability against the deteriorating effects of heat and light, which comprises a polymer of a member selected from the group consisting of ethylene and propylene and from 0.01 percent to 5.0 percent of a salt represented by the formula:

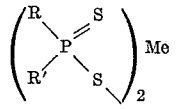

wherein R and R' are individually selected from the group consisting of alkyl of 2–18 carbons, lower cycloalkyl, monocyclic and lower aralkyl; and Me is a cation of metal selected from the group consisting of zinc, nickel, lead, cadmium, calcium, copper, tin and manganese.

2. The composition of claim 1 wherein the polymer is polypropylene.

3. The composition of claim 1 wherein the metal is zinc.

4. The composition of claim 3 wherein R and R' are each cyclohexyl.

5. The composition of claim 1 wherein R and R' are each octyl.

References Cited by the Examiner

UNITED STATES PATENTS

| | | | |
|---|---|---|---|
| 2,797,238 | 6/1957 | Miller et al. | 260—500 |
| 3,041,311 | 6/1962 | Baum | 260—45.75 |
| 3,098,057 | 6/1963 | Baum | 260—43 |
| 3,138,605 | 6/1964 | Wystrach et al. | 260—294.8 |
| 3,177,233 | 6/1965 | Calhoun | 260—429.9 |

FOREIGN PATENTS

| | | |
|---|---|---|
| 1,320,995 | 2/1963 | France. |
| 937,882 | 9/1963 | Great Britain. |

LEON J. BERCOVITZ, *Primary Examiner.*

G. W. RAUCHFUSS, *Assistant Examiner.*